United States Patent
Tsuchiya

(10) Patent No.: US 10,641,631 B2
(45) Date of Patent: May 5, 2020

(54) AIR FLOW MEASURING DEVICE

(71) Applicant: DENSO CORPORATION, Kariya, Aichi-pref. (JP)

(72) Inventor: Takuma Tsuchiya, Kariya (JP)

(73) Assignee: DENSO CORPORATION, Kariya (JP)

(*) Notice: Subject to any disclaimer, the term of this patent is extended or adjusted under 35 U.S.C. 154(b) by 180 days.

(21) Appl. No.: 15/254,202

(22) Filed: Sep. 1, 2016

(65) Prior Publication Data
US 2017/0074703 A1 Mar. 16, 2017

(30) Foreign Application Priority Data

Sep. 11, 2015 (JP) ................. 2015-179237

(51) Int. Cl.
G01F 1/684 (2006.01)
G01F 5/00 (2006.01)
G01F 1/72 (2006.01)

(52) U.S. Cl.
CPC .............. G01F 1/6842 (2013.01); G01F 1/72 (2013.01); G01F 5/00 (2013.01)

(58) Field of Classification Search
CPC .................................................. G01N 1/6842
See application file for complete search history.

(56) References Cited

U.S. PATENT DOCUMENTS

| 6,786,089 B2 * | 9/2004 | Goto ..................... G01F 1/6842 73/204.21 |
| 6,871,534 B1 | 3/2005 | Hamada et al. |
| 8,752,424 B2 * | 6/2014 | Ban ....................... G01F 1/6842 73/202 |
| 2005/0241386 A1 | 11/2005 | Goka et al. |
| 2015/0168193 A1 | 6/2015 | Morino et al. |

FOREIGN PATENT DOCUMENTS

JP 5425021 2/2014

* cited by examiner

Primary Examiner — Justin N Olamit
(74) Attorney, Agent, or Firm — Nixon & Vanderhye P.C.

(57) ABSTRACT

The cross-sectional area of a reduced passage increases at a constant ratio from a maximum reduction part where a cross-sectional area of the reduced passage becomes the smallest toward a downstream side. The cross-sectional area of the reduced passage is equal to the cross-sectional area of a bypass passage at a downstream end of a cross-sectional area increasing region intersecting with a wall surface of the bypass passage. (Cross-sectional area increase ratio)=(B−A)/X is satisfied. A [mm$^2$] is the cross-sectional area of the reduced passage at an upstream end of the increasing region. B [mm$^2$] is the cross-sectional area of the reduced passage at the downstream end of the increasing region. X [mm] is a distance from the upstream end to the downstream end of the increasing region along an air flow direction through the reduced passage. The ratio is 1.5 [mm$^2$/mm] or smaller.

6 Claims, 5 Drawing Sheets

AIR FLOW MEASURING DEVICE

CROSS REFERENCE TO RELATED APPLICATION

This application is based on Japanese Patent Application No. 2015-179237 filed on Sep. 11, 2015, the disclosure of which is incorporated herein by reference.

TECHNICAL FIELD

The present disclosure relates to an air flow measuring device that measures a flow rate of air.

BACKGROUND

An air flow measuring device that measures an intake air amount of an engine is conventionally known. This air flow measuring device includes a bypass passage that takes in a part of air flowing in an air intake duct, and a flow rate detecting element is disposed in this bypass passage. When the flow of air flowing into the bypass passage has a biased flow speed distribution, a turbulence is produced in the flow of air flowing through the flow rate detecting element. Thus, there arises the issue of reduction of the detection accuracy of the flow rate detecting element, which makes its output characteristics unstable. JP2014-1954A discloses the technique for restraining a turbulence of air by providing a reduced part in a bypass passage to reduce a cross-sectional area. The reduced part has the maximum reduction part at which the cross-sectional area of the bypass passage is the smallest, and a return surface that gradually increases the cross-sectional area is formed toward a downstream side of this maximum reduction part in the air flow direction.

However, the reduced part described in JP2014-1954A includes the flat surface perpendicular to the wall surface of the bypass passage at the downstream end of the return surface. Thus, the cross-sectional area of the bypass passage rapidly increases at the downstream end of the return surface. A vortex is accordingly generated in the region where the cross-sectional area rapidly increases, and the vortex reaching a flow rate detecting element at the time of a backflow may reduce the detection accuracy of the flow rate detecting element. The backflow means an air flow in the backward direction produced in the bypass passage due to the suction pulse of the engine.

SUMMARY

The present disclosure addresses at least one of the above issues. Thus, it is an objective of the present disclosure to provide an air flow measuring device that can restrict a generation of a vortex in a downstream region of a reduced part (cross-sectional area increased region) to prevent a detection error of a flow rate detecting element at time of a backflow.

To achieve the objective of the present disclosure, there is provided an air flow measuring device including a bypass passage, a flow rate detecting element, and a reduced part. The bypass passage takes in a part of air flowing through an air passage. The flow rate detecting element measures a flow rate of air flowing through the bypass passage. The reduced part reduces a cross-sectional area of the bypass passage in a predetermined range in a flow direction of the air flowing through the bypass passage. When a region of the bypass passage, in which the reduced part is provided, is referred to as a reduced passage, the flow rate detecting element is disposed in the reduced passage. The cross-sectional area of the reduced passage increases at a constant ratio from a maximum reduction part of the reduced part, at which a cross-sectional area of the reduced passage becomes the smallest, toward a downstream side in the flow direction of the air. The reduced part includes a cross-sectional area increasing region. The cross-sectional area of the reduced passage is formed to be equal to the cross-sectional area of the bypass passage at a downstream end of the cross-sectional area increasing region, which intersects with a wall surface of the bypass passage. An equation:

$$\text{(cross-sectional area increase ratio)} = (B-A)/X \qquad (1)$$

is satisfied, where: $A$ [mm$^2$] is the cross-sectional area of the reduced passage at an upstream end of the cross-sectional area increasing region; $B$ [mm$^2$] is the cross-sectional area of the reduced passage at the downstream end of the cross-sectional area increasing region; and $X$ [mm] is a distance from the upstream end of the cross-sectional area increasing region to the downstream end of the cross-sectional area increasing region along a flow direction of air flowing through the reduced passage. The cross-sectional area increase ratio defined by the above equation (1) is set to be equal to or smaller than 1.5 [mm$^2$/mm].

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An embodiment will be described in detail.

Figure 1:
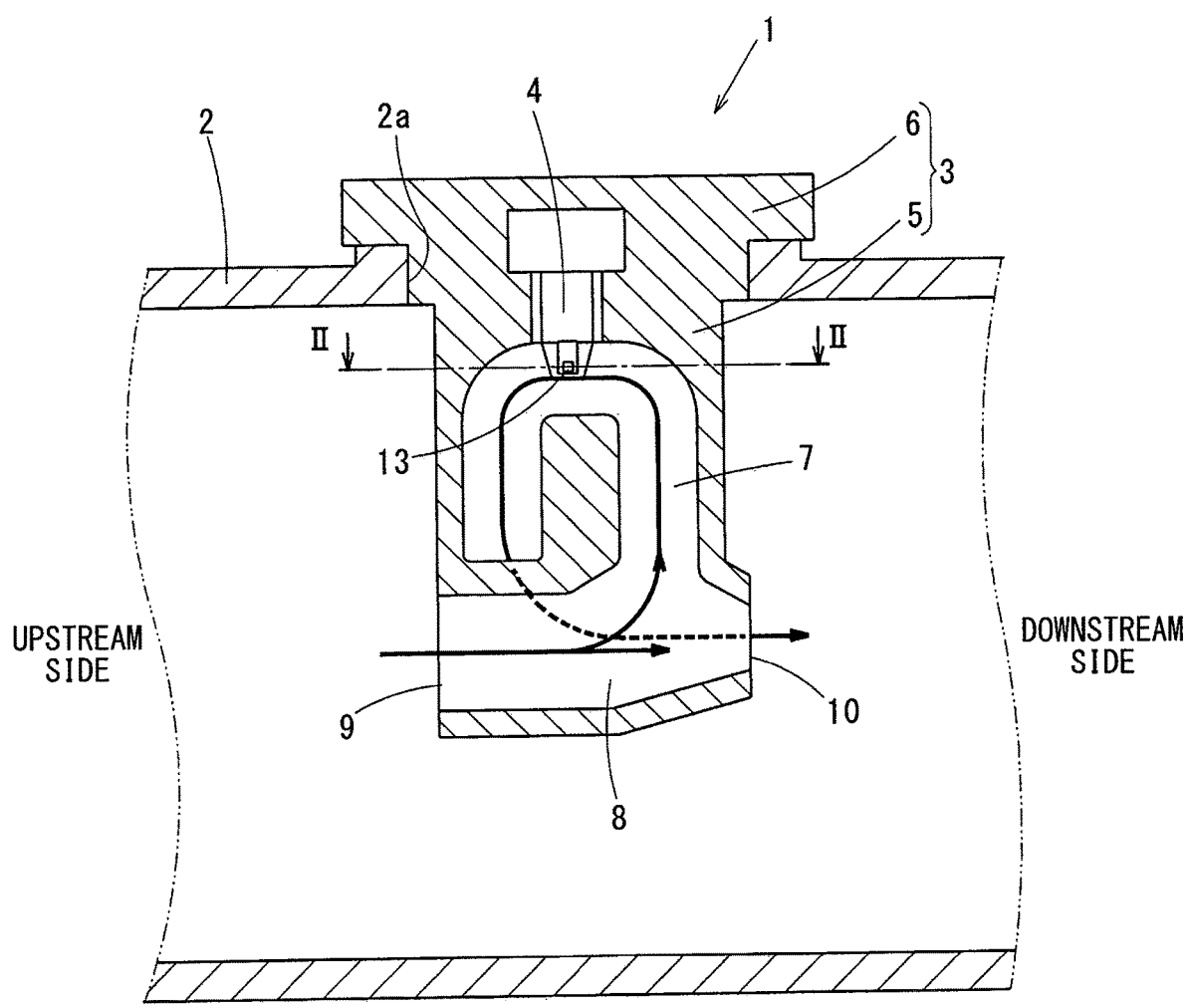
FIG. 1 is a sectional view illustrating an air flow measuring device in accordance with an embodiment.

The embodiment illustrates an example of an air flow measuring device 1 that measures an intake air amount of an engine for an automobile. As illustrated in FIG. 1, the air flow measuring device 1 includes a housing 3 that is attached to an air intake duct 2 of the engine, and a flow sensor 4 that is incorporated into this housing 3. The air intake duct 2 is disposed, for example, on an upstream side of a throttle valve (not shown) to form an "air passage." The air intake duct 2 includes an attachment hole 2a for attaching the housing 3. The housing 3 includes a housing part 5 that is inserted into the air intake duct 2 through the attachment hole 2a, and a connector mounting part 6 that is taken out of the air intake duct 2 through the attachment hole 2a.

The housing part 5 includes a bypass passage 7 that takes in a part of air flowing in the air intake duct 2, and a dust discharge passage 8 for discharging the dust contained in the taken-in air. The bypass passage 7 is formed to communicate in a loop shape between an intake port 9 for air that opens on the front surface of the housing part 5, and a bypass outlet 10 that opens on the rear surface of the housing part 5. This bypass passage 7 includes a reduced part 11 (see FIG. 2) in the passage 7, and this reduced part 11 reduces the cross-sectional area of the bypass passage 7. The region of the bypass passage 7, in which the reduced part 11 is provided, is hereinafter referred to as a reduced passage 7a. The dust discharge passage 8 is formed to communicate in a generally linear shape between the intake port 9 and the bypass outlet 10, and can make the dust, which has flowed in through the intake port 9, flow straight and discharge the dust through the bypass outlet 10.

After the primary formation of the housing part 5, the connector mounting part 6 is secondarily formed with the flow sensor 4 incorporated in the housing part 5. Terminals are inserted into this connector mounting part 6. One end of the terminal is electrically connected to the terminal of the flow sensor 4, and the other end of the terminal is used as a connector terminal (not shown). The flow sensor 4 includes a flow rate detecting element 13 that is held by a resin package 12 (see FIG. 2) and that is disposed in the bypass passage 7, and a control circuit part (not shown) that generates an electrical signal in accordance with a flow rate of air and a flow direction of air based on the information detected by this flow rate detecting element 13. The electrical signal that is generated by the control circuit part is outputted to an external ECU (not shown) through the electric wire that is connected to the connector terminal.

Figure 2:
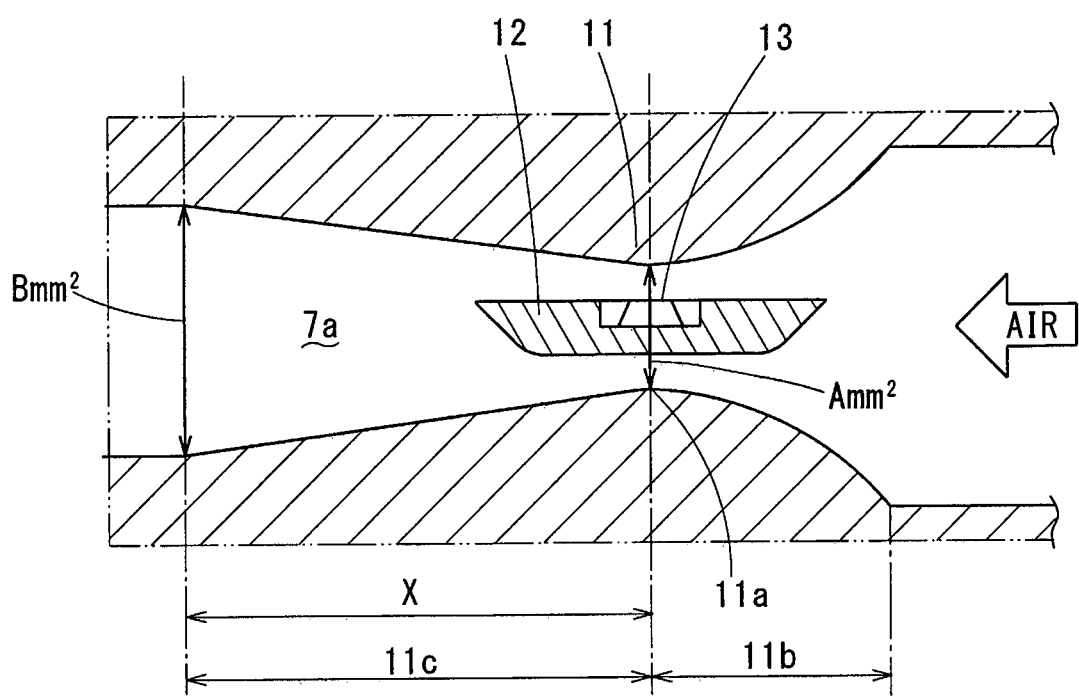
FIG. 2 is a sectional view taken along a line II-II in FIG. 1 illustrating a reduced part provided in a bypass passage.

As illustrated in FIG. 2, the reduced part 11 that is provided in the bypass passage 7 includes a maximum reduction part 11a, at which the cross-sectional area of the reduced passage 7a is the smallest. The reduced part 11 includes a cross-sectional area reducing region 11b on an upstream side (right side in FIG. 2) of this maximum reduction part 11a, and a cross-sectional area increasing region 11c on a downstream side (left side in FIG. 2) of the maximum reduction part 11a. The flow rate detecting element 13 is disposed at the maximum reduction part 11a in the reduced passage 7a. The upper-lower direction of the reduced passage 7a in FIG. 2 is hereinafter defined as a width direction, and the direction that is perpendicular to this width direction (direction perpendicular to the plane of paper) is hereinafter defined as a height direction. The distance between the two side surfaces that are opposed to each other in the width direction is hereinafter referred to as a passage width, and the distance between the two side surfaces that are opposed to each other in the height direction is hereinafter referred to as a passage height.

The maximum reduction part 11a is located at the intersection part where the cross-sectional area reducing region 11b and the cross-sectional area increasing region 11c intersect. Thus, the maximum reduction part 11a is the downstream end of the cross-sectional area reducing region 11b, and is also the upstream end of the cross-sectional area increasing region 11c. The two side surfaces of the cross-sectional area reducing region 11b that are opposed to each other in the width direction are provided to be curved. The passage width of the cross-sectional area reducing region 11b reduces gradually from the upstream end of the cross-sectional area reducing region 11b to the maximum reduction part 11a. The passage width at the upstream end of the cross-sectional area reducing region 11b is the same as the passage width of the bypass passage 7 on an upstream side of the reduced part 11. In other words, the cross-sectional area of the reduced passage 7a is formed to be the same as the cross-sectional area of the bypass passage 7 on an upstream side of the reduced part 11 at the upstream end of the cross-sectional area reducing region 11b where the two side surfaces of the reduced passage 7a opposed to each other in the width direction intersect with the side surfaces of the bypass passage 7.

The two side surfaces of the cross-sectional area increasing region 11c that are opposed to each other in the width direction are provided to be inclined linearly relative to the air flow direction. The passage width of the cross-sectional area increasing region 11c is formed to increase at a constant ratio from the maximum reduction part 11a to the downstream end of the cross-sectional area increasing region 11c. The passage width of the cross-sectional area increasing region 11c on the downstream side is the same as the passage width of the bypass passage 7 on a downstream side of the reduced part 11. In other words, the cross-sectional area of the reduced passage 7a is formed to be the same as the cross-sectional area of the bypass passage 7 on a downstream side of the reduced part 11 at the downstream end of the cross-sectional area increasing region 11c where the two side surfaces of the reduced passage 7a opposed to each other in the width direction intersect with the side surfaces of the bypass passage 7. The passage height in the cross-sectional area reducing region 11b and the cross-sectional area increasing region 11c is constant, and is the same as the passage height on upstream and downstream sides of the reduced part 11. Thus, the reduced part 11 narrows the passage width to reduce the cross-sectional area of the reduced passage 7a.

A cross-sectional area increase ratio of the embodiment will be explained below. The cross-sectional area increase ratio is a ratio between the cross-sectional area of the reduced passage 7a at the upstream end (maximum reduction part 11a) of the cross-sectional area increasing region 11c and the cross-sectional area of the reduced passage 7a at the downstream end of the cross-sectional area increasing region 11c, and is defined by the following equation (1):

$$\text{(cross-sectional area increase ratio)} = (B-A)/X \qquad (1),$$

where: the cross-sectional area of the reduced passage 7a at the upstream end of the cross-sectional area increasing region 11c is A [mm$^2$]; the cross-sectional area of the reduced passage 7a at the downstream end of the cross-sectional area increasing region 11c is B [mm$^2$]; and the distance from the upstream end to the downstream end of the cross-sectional area increasing region 11c along the air flow direction is X [mm] (see FIG. 2). To clarify the cross-sectional area increase ratio that can limit the generation of a vortex, the embodiment uses a loss coefficient for an index expressing the vortex generation as a numerical value.

The method for obtaining the loss coefficient will be described below. The loss of a pipe conduit includes a friction loss generated between fluid and the wall surface of the pipe conduit, and a local loss due to the vortex generated in an expanding pipe or a contracting pipe whose passage sectional area changes. When the local loss head is "hs", "hs" is expressed generally in the form of the following equation (2):

$$hs = \zeta \times (Vm^2/2g) \qquad (2),$$

where: "g" is the gravity acceleration; the loss head is a lost energy per unit weight of fluid; "Vm" is a pipe cross section average flow speed (larger value of Vm is used if the cross-sectional area changes); "ζ" is a loss coefficient, and is a constant independent of conditions such as the flow speed and the diameter of the pipe conduit in the range of a normal flow.

The total loss head ($H_1-H_2$) is expressed by the sum of the friction loss head "hf" and the local loss head "hs." Thus, "hs" can also be expressed in the form of the following equation (3):

$$hs=H_1-H_2-hf=(Vm1^2/2g+p1/\rho g)-(Vm2^2/2g+p2/\rho g)-hf \quad (3),$$

where: "$\rho$" is a density; and "p" is a pressure. In the range of a normal flow, the friction loss head "hf" can be calculated based on the following equations (4) to (6):

$$hf=\lambda \times L/d \times (Vm^2/2g) \quad (4);$$

$$\lambda=0.3164 \times Re^{-0.25} \quad (5); \text{ and}$$

$$Re=Vm \times d/\nu \quad (6)$$

where: "$\lambda$" is a coefficient of pipe friction; "L" is a pipe conduit length; "d" is a pipe conduit diameter; "Re" is Reynolds number; and "$\nu$" is a kinetic viscosity.

Figure 3:
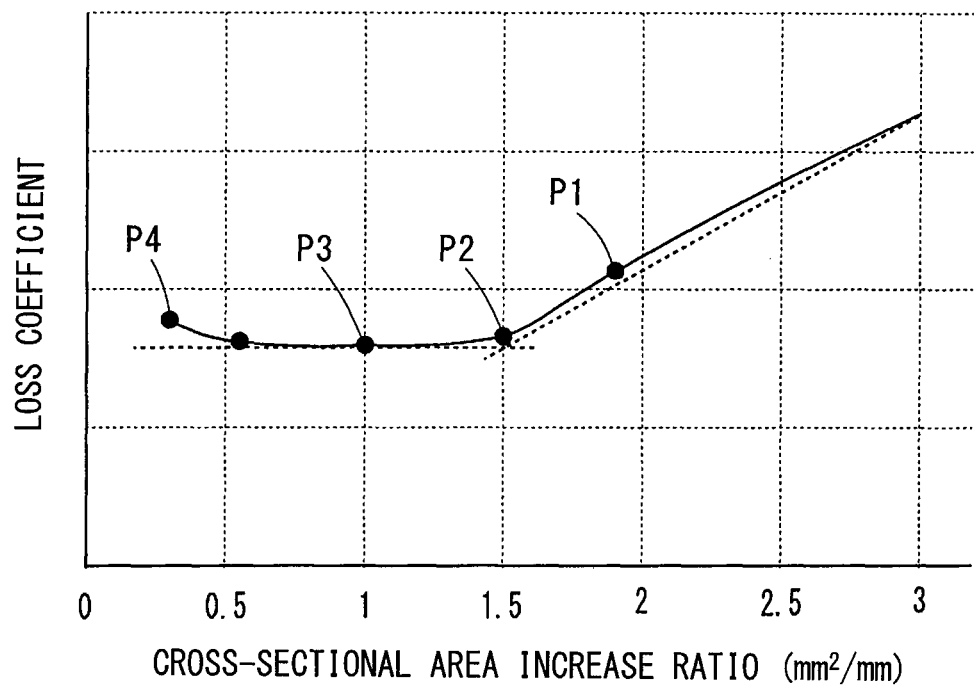
FIG. 3 is a correlation graph between a loss coefficient and a cross-sectional area increase ratio according to the embodiment.

As expressed by the above equation (2), the local loss head "hs" correlates with the loss coefficient "$\zeta$", and the local loss head "hs" becomes smaller as the loss coefficient "$\zeta$" becomes smaller. Thus, clarifying the cross-sectional area increase ratio that can make smaller the loss coefficient can restrain the vortex generation. For the correlation between the cross-sectional area increase ratio and the loss coefficient, FIG. 3 shows that the loss coefficient greatly changes with the cross-sectional area increase ratio of 1.5 [mm$^2$/mm] as its boundary. Thus, the loss coefficient is generally constant, and indicates low values overall in the region that is equal to or smaller than the cross-sectional area increase ratio of 1.5 [mm$^2$/mm]. In contrast, the loss coefficient becomes larger approximately in proportion as the cross-sectional area increase ratio becomes larger in the region that is larger than the cross-sectional area increase ratio of 1.5 [mm$^2$/mm].

Figure 4:
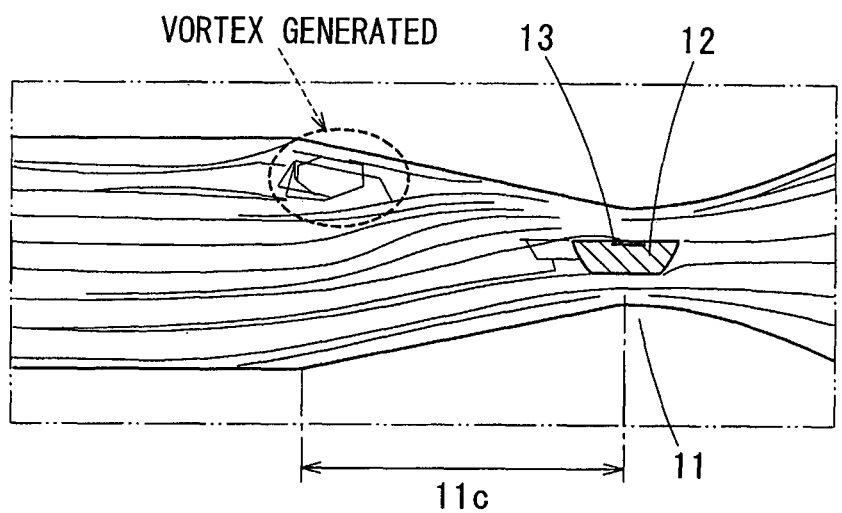
FIG. 4 is an oil flow diagram visualizing a flow of air flowing through the bypass passage of the embodiment.
Figure 5:
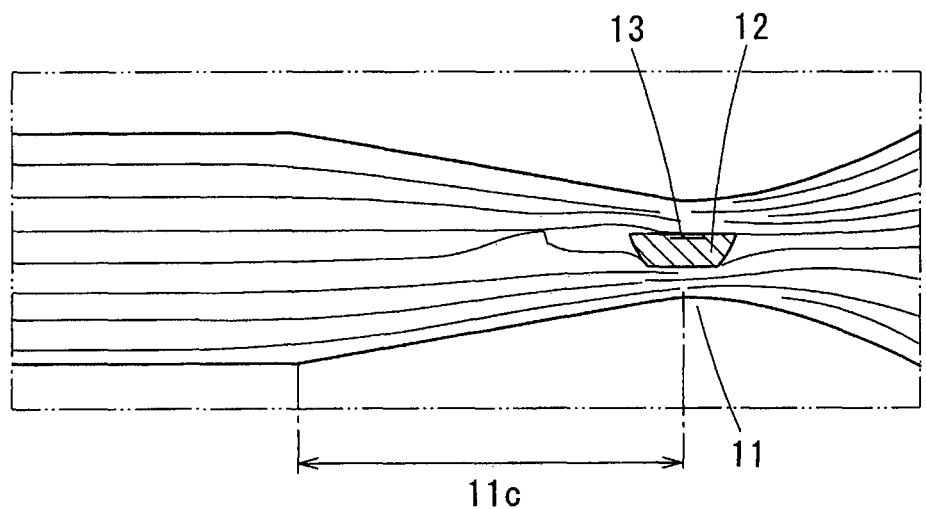
FIG. 5 is an oil flow diagram visualizing the flow of air flowing through the bypass passage of the embodiment.
Figure 6:
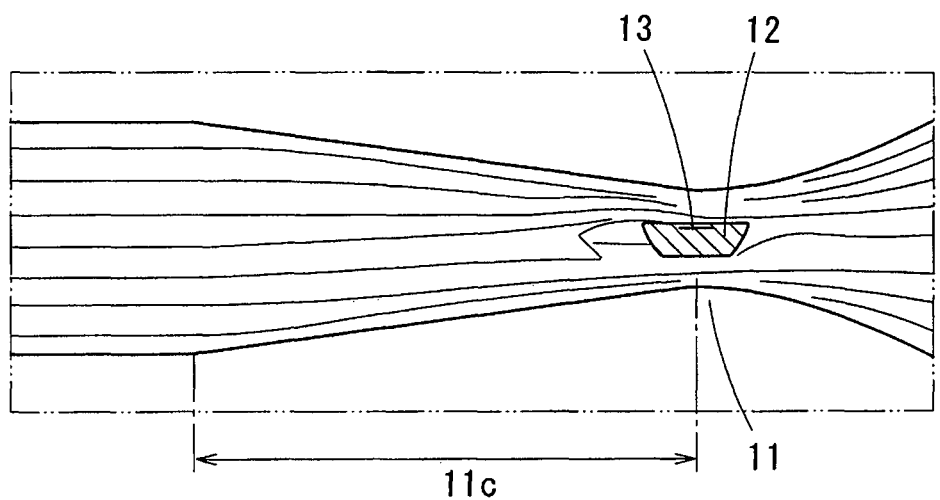
FIG. 6 is an oil flow diagram visualizing the flow of air flowing through the bypass passage of the embodiment.
Figure 7:
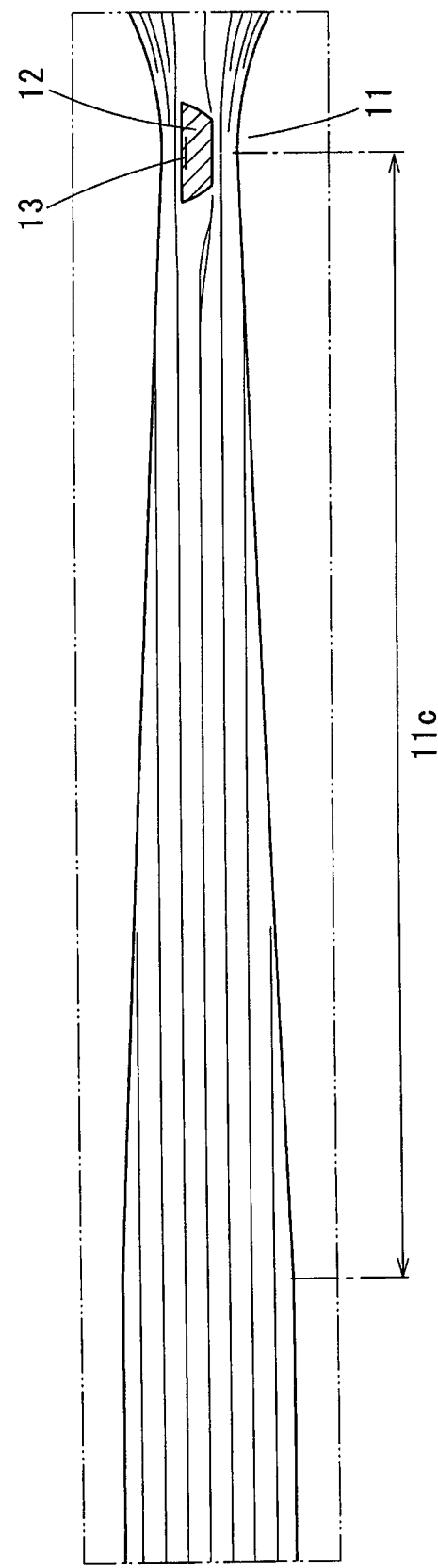
FIG. 7 is an oil flow diagram visualizing the flow of air flowing through the bypass passage of the embodiment.

FIGS. 4 to 7 are oil flow diagrams visualizing the air flow through numerical simulations. The magnitude of the cross-sectional area increase ratio is appropriately chosen and the flow of air was observed for the region in which the cross-sectional area increase ratio is larger than 1.5 [mm$^2$/mm] and the region in which the cross-sectional area increase ratio is equal to or smaller than 1.5 [mm$^2$/mm]. In the region (P1 in FIG. 3) in which the cross-sectional area increase ratio is larger than 1.5 [mm$^2$/mm], it can be found that a vortex is generated on a downstream side of the maximum reduction part 11a at which the flow rate detecting element 13 is disposed as illustrated in FIG. 4. In contrast, in the region (P2, P3, P4 in FIG. 3) in which the cross-sectional area increase ratio is equal to or smaller than 1.5 [mm$^2$/mm], the vortex generation is not found at any of P2, P3, P4 as illustrated in FIGS. 5 to 7. As a result of the above, the cross-sectional area increase ratio of the reduced part 11 is set to be equal to or smaller than 1.5 [mm$^2$/mm] in the embodiment.

The operation and effects of the embodiment will be described below. The cross-sectional area of the reduced passage 7a increases at a constant ratio in the cross-sectional area increasing region 11c of the reduced part 11 of the embodiment. Thus, the cross-sectional area of the reduced passage 7a does not rapidly increase at the downstream end of the cross-sectional area increasing region 11c, at which the side surface of the reduced passage 7a and the side surface of the bypass passage 7 intersect. In particular, setting the cross-sectional area increase ratio that is defined by the above equation (1) to be equal to or smaller than 1.5 [mm$^2$/mm] can decrease the loss coefficient of the bypass passage 7. Consequently, the vortex generation due to the rapid increase of the cross-sectional area can be restricted. The vortex generation is not found as long as the air flow is observed with reference to the above oil flow diagrams illustrated in FIGS. 5 to 7. Therefore, when a backflow due to the suction pulse of the engine is formed, the vortex does not reach the flow rate detecting element 13, and accordingly the detection error of the flow rate detecting element 13 can be prevented.

A modification to the above embodiment will be described below. The embodiment provides the maximum reduction part 11a at the intersection part where the cross-sectional area reducing region 11b and the cross-sectional area increasing region 11c intersect. Alternatively, the maximum reduction part 11a can be formed over a predetermined length in the air flow direction.

Characteristics of the air flow measuring device 1 of the above embodiment can be described as follows.

An air flow measuring device 1 includes a bypass passage 7, a flow rate detecting element 13, and a reduced part 11. The bypass passage 7 takes in a part of air flowing through an air passage 2. The flow rate detecting element 13 measures a flow rate of air flowing through the bypass passage 7. The reduced part 11 reduces a cross-sectional area of the bypass passage 7 in a predetermined range in a flow direction of the air flowing through the bypass passage 7. When a region of the bypass passage 7, in which the reduced part 11 is provided, is referred to as a reduced passage 7a, the flow rate detecting element 13 is disposed in the reduced passage 7a. The cross-sectional area of the reduced passage 7a increases at a constant ratio from a maximum reduction part 11a of the reduced part 11, at which a cross-sectional area of the reduced passage 7a becomes the smallest, toward a downstream side in the flow direction of the air. The reduced part 11 includes a cross-sectional area increasing region 11c. The cross-sectional area of the reduced passage 7a is formed to be equal to the cross-sectional area of the bypass passage 7 at a downstream end of the cross-sectional area increasing region 11c, which intersects with a wall surface of the bypass passage 7. An equation:

$$(\text{cross-sectional area increase ratio})=(B-A)/X \quad (1)$$

is satisfied, where: A [mm$^2$] is the cross-sectional area of the reduced passage 7a at an upstream end of the cross-sectional area increasing region 11c; B [mm$^2$] is the cross-sectional area of the reduced passage 7a at the downstream end of the cross-sectional area increasing region 11c; and X [mm] is a distance from the upstream end of the cross-sectional area increasing region 11c to the downstream end of the cross-sectional area increasing region 11c along a flow direction of air flowing through the reduced passage 7a. The cross-sectional area increase ratio defined by the above equation 1 is set to be equal to or smaller than 1.5 [mm$^2$/mm].

By this configuration, the cross-sectional area of the reduced passage 7a increases at a constant ratio in the cross-sectional area increasing region 11c. Thus, the cross-sectional area of the reduced passage 7a does not rapidly increase at the downstream end of the cross-sectional area increasing region 11c, at which the wall surface of the reduced passage 7a and the wall surface of the bypass passage 7 intersect with each other. In particular, setting the cross-sectional area increase ratio that is defined by the above equation (1) to be equal to or smaller than 1.5 [mm$^2$/mm] can decrease the loss coefficient of the bypass passage 7. Consequently, the vortex generation due to the rapid increase of the cross-sectional area can be restricted. This can prevent the vortex from reaching the flow rate detecting element 13 at the time of a backflow when the air flow is formed in a backward direction through the bypass passage 7. Therefore, the detection accuracy of the flow rate detecting element 13 improves.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An air flow measuring device comprising:
   a housing part including a bypass passage that takes in a part of air flowing through an air passage, and a dust discharge passage that discharges dust contained in the taken-in air; and
   a flow rate detecting element provided in the bypass passage so as to measure a flow rate of air flowing through the bypass passage, wherein
   the bypass passage is configured to communicate between an intake port for air that opens on a front side of the housing part and an outlet port that opens on a rear side of the housing part so that a part of air flowing from the intake port flows into the bypass passage and another part of air flowing from the intake port flows in the discharge passage,
   the bypass passage includes a reduced passage that reduces a cross-sectional area of the bypass passage in a predetermined range in a flow direction of the air flowing through the bypass passage, wherein:
   the flow rate detecting element is disposed in the reduced passage;
   the cross-sectional area of the reduced passage increases at a predetermined ratio from a maximum reduction part of the reduced passage, at which a cross-sectional area of the reduced passage becomes the smallest, toward a downstream side in the flow direction of the air;
   the reduced passage includes a cross-sectional area increasing region;
   the cross-sectional area of the reduced passage is formed to be equal to the cross-sectional area of the bypass passage at a downstream end of the cross-sectional area increasing region, which intersects with a wall surface of the bypass passage;
   B is the cross-sectional area of the reduced passage at the downstream end of the cross-sectional area increasing region;
   X is a distance from an upstream end of the cross-sectional area increasing region to the downstream end of the cross-sectional area increasing region along a flow direction of air flowing through the reduced passage;
   the distance of X is longer than a distance from an upstream end of a cross-sectional area reducing region to a downstream end of the cross-sectional area reducing region along the flow direction of air flowing through the reduced passage; and
   the cross-sectional area of B is smaller than a cross-sectional area of the reduced passage at the upstream end of the cross-sectional area reducing region.

2. The air flow measuring device according to claim 1, wherein the flow rate detecting element is disposed at the maximum reduction part in the reduced passage.

3. The air flow measuring device according to claim 1, wherein
   the bypass passage is configured to be in a loop shape, and
   the dust discharge passage is configured to communicate in a generally linear shape between the intake port and the outlet port so that the dust that has flowed in through the intake port flows straight and discharge the dust through the outlet port.

4. The air flow measuring device according to claim 1, wherein
   two side surfaces of the cross-sectional area of the reduced passage are opposed to each other in a width direction and are formed in a curved shape, so that a passage width of the cross-sectional area of the reduced passage reduces gradually from the upstream end of the cross-sectional area of the reduced passage to the maximum reduction part.

5. An air flow measuring device comprising:
   a bypass passage that takes in a part of air flowing through an air passage;
   a flow rate detecting element that measures a flow rate of air flowing through the bypass passage; and
   a reduced passage that reduces a cross-sectional area of the bypass passage in a predetermined range in a flow direction of the air flowing through the bypass passage, wherein:
   the flow rate detecting element is disposed in the reduced passage;
   the cross-sectional area of the reduced passage increases at a constant ratio from a maximum reduction part of the reduced passage, at which a cross-sectional area of the reduced passage becomes the smallest, toward a downstream side in the flow direction of the air;
   the reduced passage includes a cross-sectional area increasing region;
   the cross-sectional area of the reduced passage is formed to be equal to the cross-sectional area of the bypass passage at a downstream end of the cross-sectional area increasing region, which intersects with a wall surface of the bypass passage;
   an equation:

$$\text{(cross-sectional area increase ratio)} = (B-A)/X \qquad (1)$$

is satisfied,
   where:
   A is the cross-sectional area of the reduced passage at an upstream end of the cross-sectional area increasing region;
   B is the cross-sectional area of the reduced passage at the downstream end of the cross-sectional area increasing region; and
   X is a distance from the upstream end of the cross-sectional area increasing region to the downstream end of the cross-sectional area increasing region along a flow direction of air flowing through the reduced passage;
   the cross-sectional area increase ratio defined by the above equation (1) is set to be equal to or smaller than 1.5;
   the distance of X is longer than a distance from an upstream end of a cross-sectional area reducing region to a downstream end of the cross-sectional area reducing region along the flow direction of air flowing through the reduced passage; and
   the cross-sectional area of B is smaller than a cross-sectional area of the reduced passage at the upstream end of the cross-sectional area reducing region.

6. The air flow measuring device according to claim 5, wherein the flow rate detecting element is disposed at the maximum reduction part in the reduced passage.

\* \* \* \* \*